Oct. 27, 1953   R. B. TREER   2,656,754
SPINDLE POSITIONER FOR MACHINE TOOLS
Filed July 5, 1951   4 Sheets-Sheet 1

INVENTOR.
ROSS B. TREER
BY Hudson, Boughton,
Williams, David & Hoffmann
ATTORNEYS

Oct. 27, 1953  R. B. TREER  2,656,754
SPINDLE POSITIONER FOR MACHINE TOOLS
Filed July 5, 1951  4 Sheets-Sheet 2

INVENTOR.
Ross B. Treer
BY Hudson, Boughton,
Williams, David & Hoffmann
ATTORNEYS Oct. 27, 1953

R. B. TREER

2,656,754

SPINDLE POSITIONER FOR MACHINE TOOLS

Filed July 5, 1951

INVENTOR.
ROSS B. TREER
BY Hudson, Boughton,
Williams, David & Hoffmann
ATTORNEYS Patented Oct. 27, 1953

2,656,754

UNITED STATES PATENT OFFICE 2,656,754

SPINDLE POSITIONER FOR MACHINE TOOLS

Ross B. Treer, Lakewood, Ohio, assignor to The Warner & Swasey Company, Cleveland, Ohio, a corporation of Ohio Application July 5, 1951, Serial No. 235,207

20 Claims. (Cl. 82—28)

This invention relates to a machine tool and more particularly to means for stopping the work spindle of the machine tool in a predetermined position.

The principal object of the invention is to provide in a machine tool means for stopping the work spindle in a predetermined position to thus facilitate the loading and unloading of work pieces.

Another object is to provide in a machine tool means for stopping the work spindle in a predetermined position and which means is positive, accurate and efficient in operation.

Another object of the invention is to provide in a machine tool means for stopping the work spindle in a predetermined position and which means includes the provision that when a work speed is initiated for the spindle the brake is automatically released and the operative parts of said means are moved to their normal inactive position.

Another object of the invention is to provide for use in a machine tool a control device for effecting the stopping of the work spindle in a predetermined position and which device constitutes a unit that can be readily attached or detached from the machine tool.

Another object of the invention is to provide in a machine tool means for stopping the work spindle in a predetermined position and which means embodies provision for imparting slow predetermined hydraulically powered rotation to the spindle to bring the same to its predetermined position, at which time said hydraulically powered rotation of the spindle is stopped in a positive manner and the brake is applied to hold the spindle in such predetermined position.

A further object is to provide in a machine tool means for stopping the work spindle in a predetermined position as referred to in the last mentioned object and which means includes hydraulically actuated mechanism for operatively interconnecting said means and the spindle.

Further and additional objects and advantages not referred to above will become apparent during the detailed description of embodiments of the invention which is to follow.

Referring to the accompanying drawings illustrating said embodiments of the invention.

The invention is shown applied to a machine tool of the type illustrated in the copending application of Myron S. Curtis and Harry Schoepe, Serial No. 198,776, filed December 2, 1950, which copending application is a continuation-in-part of an application by the same inventors filed August 22, 1947, Serial No. 770,050. It will be understood, of course, that the invention is not limited in its application to this particular type of machine tool but may be applied to various other types of machine tools and is only shown herein applied to the particular type mentioned for purposes of illustration.

Figure 1:
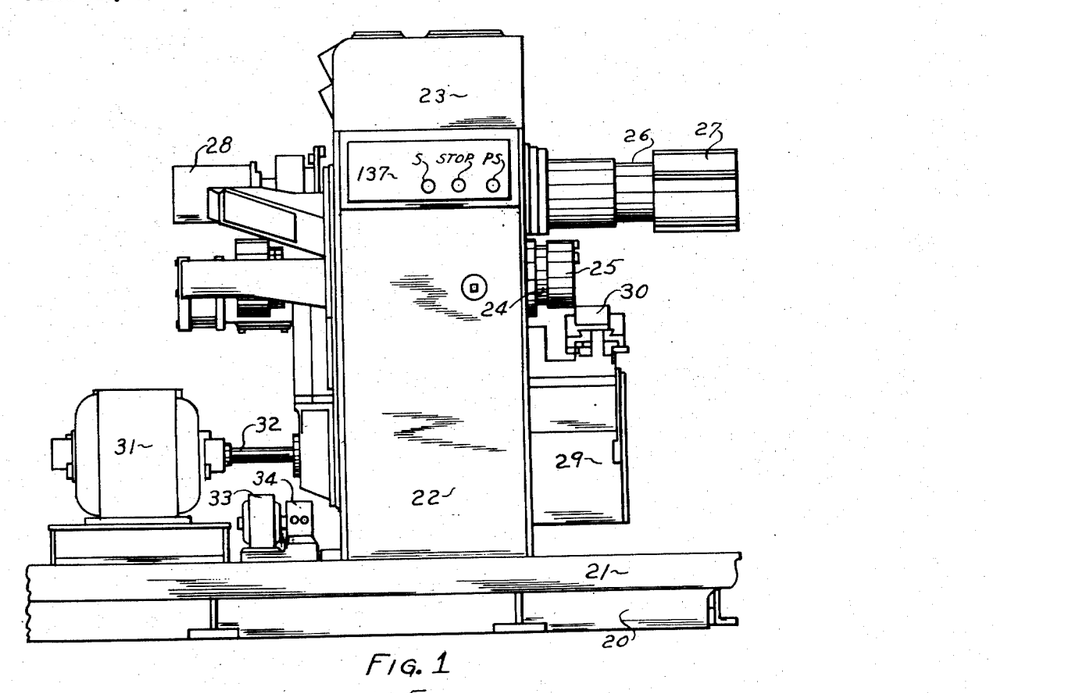
Fig. 1 is a front elevational view of a machine tool to which the invention is applied.
Figure 2:
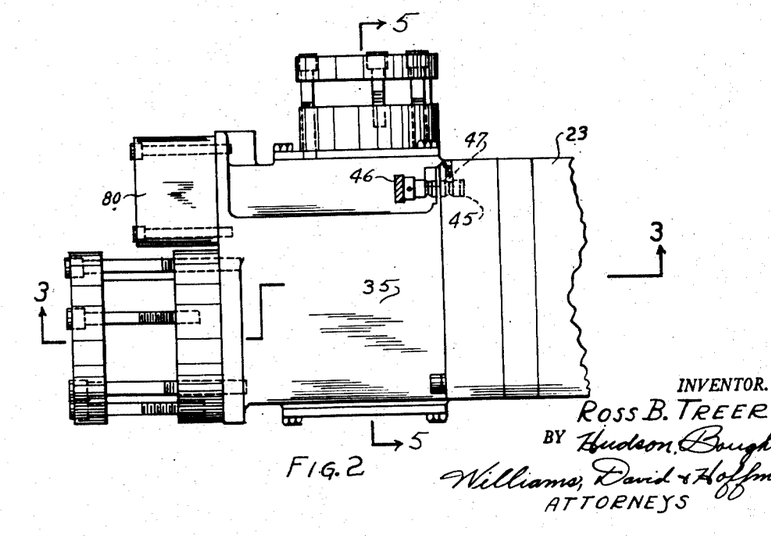
Fig. 2 is a fragmentary top plan view of a portion of the machine tool shown in Fig. 1, such portion being that containing the invention.

Referring to Fig. 1 illustrating the type of machine tool referred to, it will be seen that the machine comprises a base 20 which supports the pan 21 and the vertically extending frame and housing portions, that part of such portions located below the spindle being termed the bed 22 while the remaining and upper part being designated as the headstock 23.

The headstock rotatably supports a work spindle 24 which is provided on its outer end with a suitable chuck 25 as well understood in the art. The spindle will be called herein a work spindle but it will be understood that it might be used as a tool spindle in certain instances. The chuck 25 will be called a work chuck, but it might be used as a tool chuck. The headstock 23 also supports for reciprocating movement and indexing rotation a carrier 26 which will be termed herein a tool carrier, although it will be understood that in some instances it may function as a work carrier.

The carrier 26 is provided on its right hand end (as viewed in Fig. 1) with an axially elongated polygonal portion 27 provided with means for adjustably mounting tools thereon. The amplitude of the reciprocating movement of the carrier is constant but different lengths of cuts can be obtained by adjusting the cutting tools axially of the faces of the portion 27. The left hand end of the carrier mounts a control turret 28. The bed 22 is provided on its right hand side (as viewed in Fig. 1) with an extension 29 having on its upper surface upwardly inclined ways on which slide the front and rear cross slides, the former being indicated at 30. The machine further includes a main driving electric motor 31 mounted on the base 20 and coupled to a main drive shaft 32 extending into the bed 22 and rotatably supported therein in suitable bearings as will be well understood.

It will be understood that the main drive shaft 32 is operatively connected to the spindle 24 through suitable drive trains and to the operating mechanism for the carrier through suitable movement producing elements, which are not shown herein as they constitute no part of this invention and it should suffice to say they may take the form shown in said copending application Serial No. 198,776.

Also supported by the base may be a separate electric motor 33 which drives a pump 34 for the hydraulic system, it being understood that during operation of the machine the motor 33 and pump 34 are continuously operated.

It will be understood that the hydraulic system includes a by-pass valve to take care of those instances during the operation of the machine when hydraulic pressure is not required as is well known in the art.

The spindle positioning mechanism shown in Figs. 1 to 9 inclusive constitutes a unit which is secured to the machine at the left hand end thereof as viewed in Fig. 1 and toward the rear. This unit is substantially contained in a housing 35 secured to the machine as stated, and said housing has secured to it externally thereof the cylinders of two hydraulic motors and a switch box which will later be referred to.

The spindle 24 is operatively connected to the positioning mechanism by the gear train now to be described. The spindle 24 has fixed thereto a gear 36 which meshes with an idler gear 37 that meshes in turn with a gear 38, see Fig. 3, said idler gear 37 and said gear 38 being suitably rotatably supported in the headstock 23. The ratio between the gears 36 and 38 is one-to-one. The gear 38 meshes with a small gear 39 fixed to a short shaft 40 rotatably supported by and extending into the housing 35. The shaft 40 within the housing 35 has splined to it a small gear 41 corresponding in size to the gear 39 and shiftable axially of the shaft 40 to intermesh it with or disconnect it from a gear 42 fixed on a shaft 43 rotatably supported within the housing 35.

Figure 3:
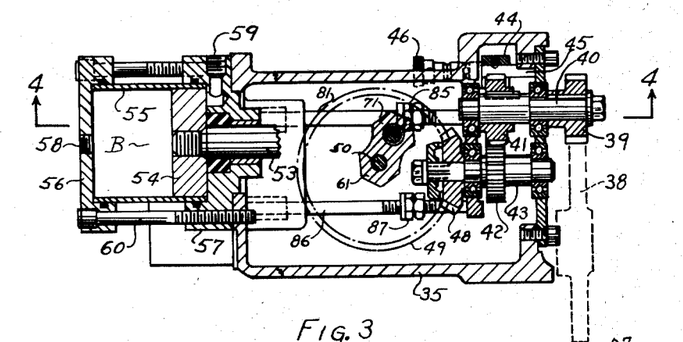
Fig. 3 is a sectional view of a portion of that part shown in Fig. 2 and is taken substantially on irregular line 3—3 of Fig. 2 and illustrates the hydraulic motor which imparts slow positioning rotation to the work spindle when the main motor has been deenergized, providing the spindle positioning switch is closed and a manually shiftable gear is in mesh to operatively interconnect the spindle and the hydraulic motor.
Figure 4:
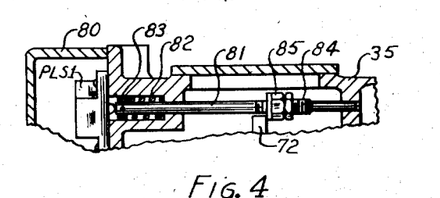
Fig. 4 is a fragmentary sectional view showing one of the actuating rods for the limit switches contained in the switch housing of the unit and is taken substantially on line 4—4 of Fig. 3.

The gears 41 and 42 have a one-to-one ratio and, as already stated, the gear 41 is shiftable. This shifting of the gear 41 is done by means of a yoke 44 which straddles the gear 41 and is fixed to a shiftable rod 45 extending outwardly of the housing and provided exteriorly thereof with an operating knob 46. The rod 45 is provided with spaced circular grooves engageable by a ball detent 47 to hold the rod 45 in either of its two shifted positions wherein the gear 41 is either meshed with the gear 42 or is disconnected therefrom.

The shaft 43 inwardly of its innermost bearing and within the housing 35 has an extended portion on which a bevel pinion 48 is fixedly mounted. The bevel pinion 48 meshes with a bevel gear 49 that is freely rotatable on a shaft 50 supported in the housing 35 at a right angle to the shaft 43 and the spindle 24. The pinion 48, through the gears 42, 41, 39, 38, 37 and 36, rotates at the same speed as the spindle and since the bevel gear 49 is twice the size of the pinion 48 said gear 49 will rotate at one-half the spindle speed.

It will be noted that when the gear 41 is intermeshed with the gear 42 then the bevel gear 49 is connected to the spindle through an unbroken gear train to rotate at a reduced rate relative to the spindle, in this particular instance at a rate one-half that of the spindle.

The shaft 50 on which the bevel gear 49 is freely rotatable mounts a pinion 51 which is meshed with a rack bar 52 formed on a rod 53 slidably supported in the housing 35 and connected to a piston 54 of a hydraulic motor. The hydraulic motor referred to will be designated herein as the spindle positioning hydraulic motor and, in addition to the piston 54, comprises a cylinder 55 closed at its opposite ends by end plates 56 and 57, said end plates being provided with threaded openings 58 and 59 communicating with the opposite ends of the cylinder 55 and into which can be screwed the coupling fittings of hydraulic conduits later to be referred to. The cylinder 55, end plates 56 and 57 are secured together and are attached as a unit to the housing 35 by means of assembling and securing screws or bolts 60 extending through the end plates and screwing into the housing 35.

It will be seen that movement of the piston 54 in the cylinder 55 of the spindle positioning hydraulic motor acts through the rod 53 and rack bar 52 to rotate pinion 51 and shaft 50 but such rotation of the shaft 50 does not impart rotative movement to the bevel gear 49 until the latter is connected to the shaft by mechanism now to be described.

Figures 5, 6, 7:
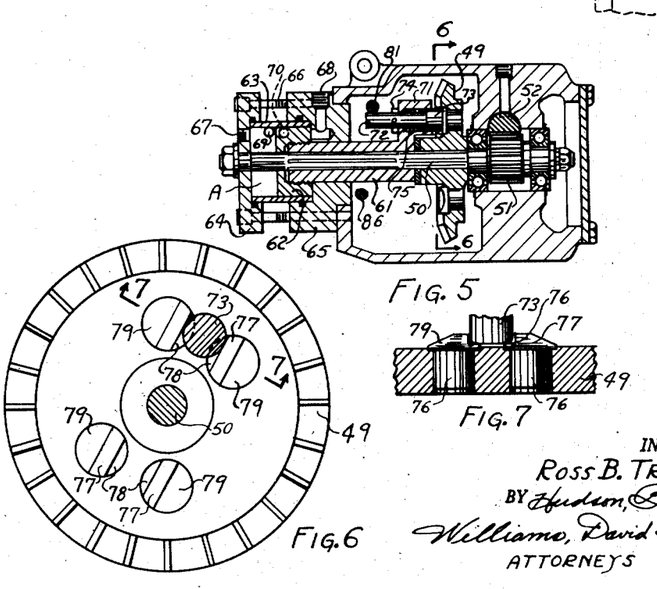
Fig. 5 is a sectional view taken at right angles to the sections of Figs. 3 and 4 and substantially on line 5—5 of Fig. 2 and illustrates the hydraulic motor which functions to connect the bevel gear to the shaft that is operated by the hydraulic motor of Fig. 3.
Fig. 6 is a fragmentary sectional view taken substantially on line 6—6 of Fig. 5 looking in the direction of the arrows.
Fig. 7 is a detached detail fragmentary view partly in section and partly in elevation and illustrates the cam abutment buttons carried by the bevel gear of Fig. 5 and shows the connecting plunger disposed intermediate said buttons in driving position, the section being taken on line 7—7 of Fig. 6.

An elongated sleeve 61 is splined on the shaft 50 for rotation therewith and movement axially thereof. The sleeve 61 extends into a hydraulic motor designated herein as the spindle connecting hydraulic motor, and is secured to the piston 62 of said motor. The piston 62 slides in a cylinder 63 and said cylinder is closed at its opposite ends by end plates 64 and 65 with the cylinder and end plates held together as a unit and the unit secured to the housing 35 by means of assembling and securing bolts or screws 66 extending through the end plates and screwed into the housing. The end plates 64 and 65 are provided with threaded openings 67 and 68 communicating with the cylinder 63 and into which end fittings of hydraulic conduits can be screwed. The cylinder 63 is also provided with openings 69 and 70 intermediate the end plates and likewise adapted to have similar end fittings of hydraulic conduits screwed therein.

The shaft 50 extends beyond the sleeve 61 and piston 62 and rotatably through the end plate 64 and is provided beyond said end plate with a retaining nut. As will later be pointed out, the positions of the openings 69 and 70 are predetermined so that the piston 62 also functions as a valve controlling the flow of hydraulic pressure medium to the spindle positioning hydraulic motor previously referred to. It will be seen that movement of the piston 62 endwise of the cylinder 63 imparts endwise movement to the sleeve 61 and at the same time said sleeve and piston can rotate with the shaft 50.

The end of the sleeve 61 opposite to the end secured to the piston 62 is provided with a radial arm portion 71 that has an opening and counterbore therethrough extending parallel to the shaft 50. A pin 72 slides in said opening and has an integral and enlarged cylindrical head 73 slidable in the counterbore. The pin 72 projects beyond the arm 71 toward the end plate 65 of the spindle connecting hydraulic motor and has fixed to it a collar 74 to limit movement of the pin toward the bevel gear 49.

A coil spring 75 surrounds the pin 72 within the counterbore in the arm 71 and abuts the bottom of the latter and the inner end of the cylindrical enlarged head 73 and normally maintains said head extended beyond the arm toward the body of the bevel gear 49 on the face side thereof and with the collar 74 in contact with the arm 71. The body of the bevel gear 49 is provided with two pairs of two spaced openings each with said pairs of openings being disposed 180° from each other. The openings of each pair mount the studs 76 of a pair of connecting buttons 77 and said buttons 77 of each pair have on their adjacent sides right-angled shouldered portions 78 forming therebetween a space to freely receive the cylindrical head 73 which when so disposed therebetween drivingly connects the arm 71, sleeve 61 and shaft 50 with the bevel gear 49. The buttons 77 are provided with inclined camming surface portions 79 which can be engaged by the head 73 and then will function to depress the head 73 against the action of the spring 75 into the recess in the arm 71 until the head 73 is in alignment with the space between the shouldered portions 78, whereupon the spring 75 moves the head 73 into position between the buttons of a pair of buttons as clearly shown in Figs. 6 and 7.

From the foregoing explanation it will be understood that when the piston 62 of the spindle connecting hydraulic motor is moved fully toward the right, as viewed in Fig. 5, and until the right hand end of the sleeve 61 contacts the hub of the gear 49, such position will be maintained as long as hydraulic pressure operates on the left hand side of the piston 62 and at this time the arm 71 is closely adjacent to the body of the gear 49 on the face side thereof. It will also be understood that in the situation just referred to rotation of the shaft 50 and sleeve 61 causes the arm 70 to revolve relative to the gear 49 until the head 73 has snapped into position between the shouldered portions 78 of a pair of buttons 77 and that thereafter the bevel gear 49 is positively driven through the pin 72 and the buttons by the sleeve 61 and shaft 50 when the latter is rotating.

It will have become apparent that when hydraulic pressure is applied to the right hand side of the piston 62, as viewed in Fig. 5, and exhausted from the left hand side thereof, then the sleeve 61 and piston 62 move axially of the shaft 50 away from the bevel gear 49 and the head 73 of the pin 72 is withdrawn from between the pair of buttons 77 and the bevel gear 49 is operatively disconnected from the sleeve 61 and shaft 50.

As will later be explained the spindle connecting hydraulic motor first operates to move the sleeve 61 and arm 71 to their most right hand position as shown in Fig. 5 and then the spindle positioning hydraulic motor previously described operates to impart through the rack bar 52, pinion 51 and shaft 50 rotative movement to the sleeve 61 and arm 71 to engage the head 73 between a pair of the buttons 77, whereupon through the unbroken gear train between the bevel gear 49 and the spindle 24 rotative positioning movement is imparted to the spindle, it being assumed that the gear 41 is intermeshed with the gear 42.

The housing 35 has secured to its end and adjacent to the spindle positioning hydraulic motor a switch box 80 containing a normally closed switch PLS1 and a normally open switch PLS2. The housing 35 slidably mounts interiorly thereof a rod 81 which is aligned with the actuating button of the switch PLS1 and is normally pressed against said button by a coil spring 82 surrounding the rod 81 and located in a recess formed in the housing 35 and acting against a collar 83 fixed to the rod. It will thus be seen that the normally closed switch PLS1 is held open by the rod 81 until the rod 81 is moved in a direction to compress the spring 82 and free the end of the rod from the button of the switch PLS1. In order that the rod 81 may be so moved at a predetermined and desired time the rod is provided with a threaded portion 84 adjustably mounting thereon an abutment nut 85 which is located in the circular path of movement of the pin 72 so as to be engaged thereby, wherefore as the sleeve 61 and gear 49 rotate said pin 72 will engage the nut 85 and move the rod 81 axially toward the right as viewed in Figs. 3 and 4 to disengage the end of the rod from the actuating button of the switch PLS1 which being normally closed thereupon closes.

The switch PLS2, as already stated, is a normally open switch but this switch is held closed by a spring-pressed rod 86 similar to the rod 81 and normally held by its spring in a position to depress the button of the normally open switch PLS2 to hold said switch closed. The rod 86 is provided with an abutment nut 87 similar to the abutment nut 85 on the rod 81 and it will be noted that the rod 86 is displaced from the rod 81 toward the spindle connecting hydraulic motor so that the nut 87 lies in the circular path of movement of the pin 72 when the sleeve 61 has been moved by said hydraulic motor toward the left as viewed in Fig. 5 to withdraw the head 73 from between a pair of the buttons 77. When the nut 87 is engaged by the pin 72 the rod 86 is shifted toward the right to disengage the end of the rod from the button of switch PLS2 and then normally open switch PLS2 opens. It will be understood that the pin 72 acts on the nut 85 during clockwise rotation of the sleeve 61 and arm 71 as viewed in Fig. 3, while the nut 87 lies in the circular path of movement of the pin 72 during counterclockwise rotation of said parts. In both instances the action of the pin 72 on the nuts 85 and 87 shift the rods 81 and 86, respectively, toward the right as viewed in Fig. 3 to disengage the ends of the rods from the switch buttons, wherefore at such time normally closed switch PLS1 closes and normally open switch PLS2 opens.

*Hydraulic and electrical operating and control circuits for the form of Figs. 1 to 9 inclusive*

An hydraulically actuated brake mechanism 88 of any suitable well known construction (shown diagrammatically in Fig. 9) is arranged to operate on the spindle 24. This brake mechanism is shown as including an actuating rod 89 extending into a hydraulic cylinder 90 of a brake actuating hydraulic motor and connected within the cylinder to a piston 91. This piston 91 is urged in a brake releasing direction by a spring 92 surrounding the rod 89 and located between the piston 91 and the lower end of the cylinder 90 as viewed in Fig. 9. The upper end of the cylinder 90 as viewed in Fig. 9 is connected to a conduit 93 which can be connected to the pressure or exhaust side of the hydraulic circuit to move the piston 91 downwardly in the cylinder 90 by hydraulic pressure to engage the brake shoe of the brake mechanism 88 with the spindle or to allow the piston 91 to move upwardly in the cylinder under the action of the spring 92 to release the brake shoe from engagement with the spindle.

The conduit 93 extends to and communicates with the interior of a valve housing 94 of a brake control valve and in which housing slidably moves a valve body 95 provided with an actuating rod 96 extending outwardly of one end of the housing 94 and later to be referred to. It will be noted that when the valve body 95 is in the lower end of the housing 94, as viewed in Fig. 9, the conduit 93 communicates with the interior of the valve housing 94 at a point located just above the valve body 95. It will also be noted that when the valve body 95 is in the position shown in Fig. 9 a conduit 97 which extends to the sump of the hydraulic system and which communicates with the lower end of the valve housing 94 is closed off by the valve body 95. A conduit 98 communicates with the interior of the valve housing 94 of the brake control valve just below the upper end thereof as viewed in Fig. 9.

The conduit 98 extends to and communicates with the interior of a valve housing 99 of a master control valve in which slide the interconnected spaced lands 100 and 101 of a valve body having an operating rod 102 extending outwardly of the housing 99 and later to be referred to. The conduit 98 communicates with the interior of the valve housing 99 intermediate the lands 100 and 101 and just above the land 100 when the valve body is in the position shown in Fig. 9.

Figures 8, 9:
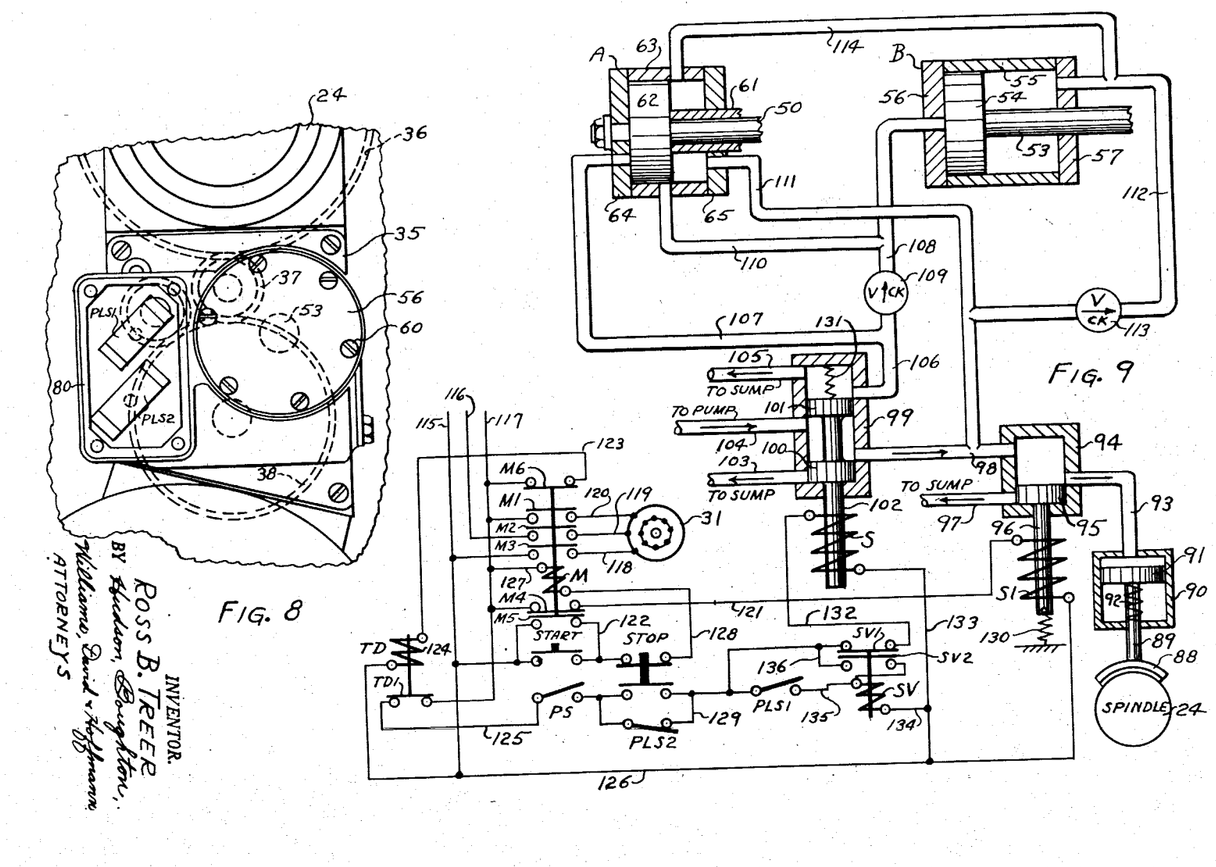
Fig. 8 is a fragmentary and elevational view taken looking from the left hand side of Fig. 1 and illustrates the limit switch housing and the hydraulic motor for imparting slow rotation to the spindle and also illustrates by dash lines certain of the gearing constituting the drive train between said hydraulic motor and the spindle and which drive train is shown in Fig. 3 in a developed view.
Fig. 9 is a diagrammatic view of the electrical control circuit, the hydraulic control valves, the hydraulic motors, the hydraulic circuit including said valves and motors and the spindle brake mechanism also located in the hydraulic circuit.

A conduit 103 communicates with the lower end of the valve housing 99 of the master control valve and extends to the sump of the hydraulic system and is closed by the land 100 when the valve body is in the position shown in Fig. 9.

A conduit 104 communicates with the valve housing 99 of the master control valve substantially midway between the ends thereof and intermediate the lands 100 and 101 and adjacent to the land 101 when the valve body is in the position shown in Fig. 9. The conduit 104 extends to the pressure side of the pump 34 of the hydraulic system, it being recalled that the usual or customary pressure relief valve is interposed in the conduit 104 between the master control valve and the pump 34.

From the description thus far given it will be seen that when the valve bodies in the housings 94 and 99 of the brake control valve and the master control valve are in the positions shown in Fig. 9, hydraulic pressure is being applied to the piston 91 of the brake actuating hydraulic motor through the conduit 104, valve housing 99, conduit 98, valve housing 94, and conduit 93 and the brake 88 is applied against the spindle.

The upper end of the valve housing 99 of the master control valve, as viewed in Fig. 9, is connected to the sump of the hydraulic system by a conduit 105 and a conduit 106 communicates with the valve housing 99 just above the valve land 101. The conduit 106 is connected to a branch conduit 107 which extends to and communicates through the opening 67 with one end of the cylinder of the spindle connecting hydraulic motor, i. e., the left hand end as viewed in Fig. 9.

The conduit 106 is also connected to a conduit 108 which extends to and communicates through the opening 58 with one end of the cylinder of the spindle positioning hydraulic motor, i. e., the left hand end thereof as viewed in Fig. 9. The conduit 108 contains a one-way check valve 109 of well known construction and which prevents the flow of hydraulic pressure through the conduit 108 in the direction indicated by the arrow.

A conduit 110 communicates through the opening 69 with the cylinder of the spindle connecting hydraulic motor intermediate the ends thereof and extends to and is connected with the conduit 108 intermediate the check valve 109 and the spindle positioning hydraulic motor.

It will be noted that when the piston 62 of the spindle connecting hydraulic motor is at its limit of movement toward the left as viewed in Fig. 9, said piston closes the opening 69 and the adjacent end of the conduit 110. The right hand end of the spindle connecting hydraulic motor, as viewed in Fig. 9, is connected through the opening 68 with a conduit 111 extending to and joining the conduit 98 intermediate the master control valve and the brake control valve, while a conduit 112 extends from the opening 59 at the right hand end of the cylinder of the spindle positioning hydraulic motor and is connected to the conduit 111.

The conduit 112 contains a check valve 113 similar to the check valve 109 and preventing flow of the hydraulic pressure fluid through the conduit 112 in the direction indicated by the arrow. A conduit 114 communicates through the opening 70 with the cylinder of the spindle connecting hydraulic motor and extends to and is connected with the conduit 112 which, as has been explained, is connected through the opening 59 with the right hand end of the cylinder of the spindle positioning hydraulic motor.

It will be noted that the conduit 114 communicates with the cylinder of the spindle connecting hydraulic motor just to the right of the piston 62 thereof when said piston is in the position indicated in Fig. 9, i. e. is at its most left hand position.

The main electric motor 31 is connected to the three leads 115, 116 and 117 of a source of electrical energy by wires 118, 119 and 120 in which are located the contacts M3, M2 and M1 of the contactor M. The contacts M3, M2 and M1 are normally open so as to maintain the motor 31 deenergized. The contactor M also contains normally closed contacts M4 located in wire 121 connected to the lead 117. In addition the contactor M includes normally open contacts M5 located in wire 122 of a holding circuit later to be referred to and connected to the lead 115. Similarly the contactor M contains normally closed contacts M6 located in wire 123 connected to the lead 117 and extending to the coil 124 of a time delay switch TD, one pole of which is connected to the lead 117 and the other pole of which to a wire 125 which will later be referred to.

The coil 124 of the time delay switch is also connected to a wire 126 which is connected to the lead 115. The coil of contactor M is connected to lead 117 by wire 127 and to lead 115 by wire 128 in which wire are located the two contacts of the normally open starting switch. The wire 122 which contains the normally open contacts M5 of contactor M forms a holding circuit around the start switch when the latter is momentarily closed and the coil of contactor M is energized to close contacts M1, M2, M3 and M5 to effect energization of the motor 31 at which time contacts M4 and M6 are opened.

The wire 128 also includes the normally closed contacts of the stop switch while the wire 125 contains the normally open contacts of said stop switch. A holding circuit around the normally switch is provided by a wire 129 connected to the wire 125 and containing the normally open switch PLS2 which, it will be remembered, is held closed by the rod 86 until the pin 72 has engaged the nut 87 and shifted said rod to allow the switch PLS2 to assume its said normally open position. The wire 125 further includes intermediate the time delay switch TD and the normally open contacts of the stop switch the normally open spindle positioning switch PS. The wires 121 and 126 are connected to the coil of the solenoid S1 which operates the valve body 95 in the valve housing 94 of the brake control valve and said solenoid S1 is of the type which exerts a pulling action on its core 96 when energized, it being understood that when this solenoid is deenergized it is moved in the opposite direction by a spring 130.

The valve in the valve housing 99 of the master control valve is actuated by a solenoid S which is of the push type, it being understood that when said solenoid S is deenergized the valve body is moved in the opposite direction by a spring 131.

The solenoid S is connected to the wire 125 by a wire 132 which contains the normally closed contacts SV1 of contactor SV. The solenoid S is also connected to wire 126 by a wire 133. The coil of contactor SV is connected by a wire 134 to the wire 133 and also by wire 135 to the wires 125 and 132.

The wire 135 contains the normally closed switch PLS1, it being remembered that said switch is held open by the rod 81 except when the pin 72 engages the nut 85 and shifts the rod. The wire 132 is connected to the coil of the contactor SV by a wire 136 which contains the normally open contacts SV2 of the contactor SV. The start switch, stop switch and the spindle positioning switch PS are carried by a switch panel 137 mounted on the front of the headstock 23 in a position where the switch buttons of said switches are easily accessible to the operator.

*Operation of form in Figs. 1 to 9 inclusive*

It will be assumed that the machine is operating in the last operative step of a work cycle and that it is desired to position the spindle 24 in a predetermined position upon the termination of the work cycle in order to unload the finished work piece from the chuck and reload a new work piece therein. It will be understood that at this time the contacts M1, M2, M3 and M5 of the contactor M are closed since the coil of contactor M is energized and the main motor 31 is running. At this time contacts M4 of contactor M are open, thus interrupting the circuit through wire 121 to solenoid S1 and deenergizing the latter, wherefore the spring 130 has moved the valve body 95 of the brake control valve to its uppermost position, at which time conduit 98 is closed off by the valve body 95 and the hydraulic motor for the brake is connected through conduit 93, valve housing 94, conduit 97 to sump and the brake mechanism 88 is released. Also at this time the solenoid S is deenergized and left hand end of the cylinders of the spindle connecting hydraulic motor and the spindle positioning hydraulic motor are connected to the sump through conduits 107, 108, 106, master control valve housing 99 and conduit 105. At this time the right hand end of the cylinder of the spindle connecting motor is connected to the pressure side of the system through conduit 104, master control valve housing 99, conduit 98 and conduit 111. The right hand end of the cylinder of the spindle positioning motor is connected to pressure through the spindle connecting motor and conduits 114 and 112. In addition, at this time contacts M6 of contacts M are open and the circuit to the coil 124 is broken and the time delay switch TD is open.

It will be assumed that the operator has moved the knob 46 to shift the rod 45 and the gear 41 to a position where said gear is in mesh with the gear 42 to provide an unbroken gear train to the spindle 24 from the bevel gear 49. During the last operative step of the cycle the operator closes the spindle positioning switch PS if it has not already been closed and at the end of the last step he actuates the stop switch to open the normally closed contacts thereof in wire 128 and close the normally open contacts of the stop switch in wire 125.

The opening of the normally closed contacts in wire 128 deenergizes contactor M causing contacts M1, M2 and M3 thereof to open and deenergize the motor 31 and normally closed contacts M4 and M6 to close and normally open contacts M5 to open. The closing of the normally closed contacts M4 energizes solenoid S1 to move the valve body 95 of the brake control valve to the position shown in Fig. 9, whereupon the brake is applied to the spindle by the brake actuating hydraulic motor to decelerate the spindle. The closing of normally closed contacts M6 energizes the coil 124 and after a suitable time delay during which the spindle rotation is decelerated by the now applied brake mechanism the time delay switch TD is closed to connect lead 117 with wire 125.

Since the spindle positioning switch PS has been closed and the normally open contact of the stop switch in wire 125 also has been closed and is momentarily being held closed by the operator, the circuit to solenoid S is energized through wire 125 and wire 132 containing the normally closed contacts SV1 of contactor SV, it being recalled that solenoid S is also connected through wire 133 to wire 126.

The energization of solenoid S moved the valve body of the master control valve and its lands 100 and 101 in the valve housing 99 to their uppermost position and against the action of the spring 131, thus positioning the land 100 intermediate the conduits 104 and 98 to disconnect the pump side of the hydraulic circuit from the conduit 98 and connect the latter conduit to the sump side through the conduit 103. This results in the brake actuating hydraulic motor being connected to exhaust through the valve housing 94 of the brake control valve and conduit 93, whereupon the brake is released. It will be recalled that at this time the solenoid S1 is energized and the brake control valve is in the position shown in Fig. 9.

The operator continues to hold the stop switch depressed until the rack bar 52 is moved by the spindle positioning hydraulic motor as will now be set forth. The energization of solenoid S has already been explained as having shifted the valve body in the valve housing 99 of the master control valve to its uppermost position from that shown in Fig. 9. This movement of the valve body of the master control valve, in addition to effecting release of the brake mechanism, places the conduits 104 and 106 in communication with the space between the lands 100 and 101, wherefore the conduit 106 is connected to the pump side of the hydraulic circuit. Hence hydraulic pressure fluid flows from the conduit 106 through conduit 107 to the left hand end of the cylinder of the spindle connecting hydraulic motor to move the piston 62 thereof from its most left hand position as viewed in Fig. 9 to its most right hand position as viewed in Fig. 5, it being recalled that hydraulic fluid cannot flow from the conduit 108 through the conduit 108 because of check valve 109. At this time the right hand end of the cylinder of the spindle connecting motor is connected to sump through conduits 111 and 98, the master control valve housing, and conduit 103.

The movement of the piston 62 just referred to shifts the sleeve 61 and arm 71 toward the body of the gear 49 and into a position where the head 73 of the pin 72 will engage between a pair of buttons 77 as soon as it is aligned therewith upon rotation of the shaft 50 as will later be explained.

The movement of the piston 62 from its most left hand position to its most right hand position in the cylinder 63 of the spindle connecting hydraulic motor opens the opening 69 in the cylinder 63 and thus connects the interior of the cylinder 63 with the conduit 108 through the conduit 110, whereupon hydraulic pressure fluid flows through the conduits 110 and 108 to the left hand end of the cylinder of the spindle positioning hydraulic motor, it being noted that the opening 70 in the cylinder 63 of the spindle connecting hydraulic motor is now closed by the piston 62 to close off the conduit 114. Hydraulic pressure fluid thus flowing to the spindle positioning hydraulic motor moves the piston 54 thereof from its most left hand position as shown in Fig. 9 toward its most right hand position. At this time the right hand end of the cylinder of the spindle positioning hydraulic motor is connected to sump through conduits 112, 111 and 98, master control valve housing, and conduit 103. This movement toward the right of the piston 54 and its rod 53 moves the rack bar 52 forming part of said rod 53 to rotate pinion 51 and shaft 50 together with the sleeve 61 and arm 71 and head 73 of the pin 72, it being understood that as soon as the head 73 aligns with the space between a pair of the buttons 77 said head 73 snaps into engagement with the buttons as shown in Fig. 7 and bevel gear 49 is operatively connected to the shaft 50 and rotates therewith.

It should be borne in mind that at the start of the rotative movement just referred to with respect to the sleeve 61 and shaft 50 the pin 72 is engaging the nut 87 on the rod 86 and holding said rod shifted against the action of its spring and out of contact with the button of normally open switch PLS2 which switch thus far has been open. As soon as the rotative movement referred to commences the pin 72 moves away from the nut 87 and the rod 86 moves under the action of its spring into contact with the button of switch PLS2 and closes said normally open switch and holds the same closed. Consequently as soon as this occurs a holding circuit is established around the contacts of the stop switch in wire 125, whereupon the operator can release the stop switch. As the piston 54 continues to move toward the right of Fig. 9 the rotation of shaft 50, sleeve 61 and bevel gear 49 continues and said rotation is transmitted positively from the bevel gear 49 to the spindle 24 through the unbroken gear train including the gears 48, 42, 41, 39, 38, 37 and 36. This effects slow positive rotation of the spindle and as soon as the piston 54 reaches the end of its movement toward the right the spindle has been brought to the predetermined and desired position and further movement of the piston 54 and rotation of the spindle 24 are terminated as the piston abuts the end of the cylinder of the spindle positioning hydraulic motor.

At this time the pin 72 has moved clockwise through a sufficient arc to engage the nut 85 and shift the rod 81 against the action of its spring to move it out of contact with the button of normally closed switch PLS1, wherefore said switch which previously had been held open by the rod, immediately closes. The closing of the switch PLS1 energizes contactor SV to open normally closed contacts SV1 thereof in wire 132 and close normally open contacts SV2 thereof in wire 136. The opening of the contacts SV1 deenergizes solenoid S and the valve body in valve housing 99 of the master control valve is moved by its spring 131 from its uppermost position to its lowermost position as indicated in Fig. 9. Consequently conduit 98 is now connected to the pump side of the hydraulic circuit through conduit 104 and therefore hydraulic pressure fluid is applied to the piston 91 of the brake actuating hydraulic motor and the brake 88 is applied to the spindle to hold the latter in said predetermined position, it being recalled that solenoid S1 has been and remains energized and that the brake control valve is still in the position of Fig. 9.

It will now be seen that the pump side of the hydraulic circuit is connected through the master control valve with conduits 98 and 111 and thus with the right hand end of the cylinder of the spindle connecting hydraulic motor so that the piston 62 thereof moves from its most right hand position to its most left hand position, as viewed in Fig. 9, with the result that the sleeve 61 is moved toward the left away from the bevel gear 49 and the head 73 of the pin 72 is disengaged from between the pair of pins 77 and the operative connection to the bevel gear 49 from the sleeve 61 interrupted so that the spindle 24 is not now connected to the shaft 50. At this time no hydraulic pressure fluid is flowing through the conduit 112 to the spindle positioning hydraulic motor because of the check valve 113 while the left end of the cylinder of the spindle connecting motor is connected to sump through conduits 107 and 106, valve housing 99 and conduit 105.

When the piston 62 reaches its most left hand position the opening 69 for the conduit 110 is closed by the piston 62 and the opening 70 for the conduit 114 is placed in communication with the conduit 111 through the interior of the cylinder 63, wherefore hydraulic pressure fluid flows through conduit 114 into the conduit 112 and thence into the right hand end of the cylinder of the spindle positioning motor to move the piston 54 thereof from its most right hand position to its most left hand position as shown in Fig. 9. The left hand end of the cylinder of the spindle positioning hydraulic motor is connected to sump through conduits 108 and 106, master control valve and conduit 105. This movement of the piston 54 moves the rack bar 52 in the reverse direction and thus rotates pinion 51, shaft 50 and sleeve 61 to impart counterclockwise rotation to the arm 71 which has already been disconnected from bevel gear 49 so that when the pin 72 has moved counterclockwise through the predetermined arc it engages the nut 87 to shift the rod 86 against its spring and out of engagement with the actuating button for switch PLS2, whereupon said switch being normally open, assumes that condition.

It will be understood that the start of the counterclockwise rotation referred to moves the pin 72 out of contact with the nut 85 and hence the rod 81 is shifted by its spring to actuate normally closed switch PLS1 to and hold the same in open position. The opening of switch PLS1 does not affect the energization of contactor SV, since a holding circuit to the contactor has been established from wire 132 through wire 136 which contains the now closed but normally open contacts SV2. Hence solenoid S is maintained deenergized throughout the counter rotation of the shaft 50, sleeve 61 and arm 71. Also during the period just referred to the brake 88 remains applied to the spindle.

At the end of the counterclockwise rotation, as already stated, normally open switch PLS2 is open since the rod 86 has been shifted out of engagement with the actuating button of the switch and this condition obtains until a spindle positioning operation is again effected. The spindle has now been stopped and held in the desired position and the finished work piece is removed from the chuck and a new work piece mounted therein, whereupon the operator operates the start switch to energize contactor M and the main motor 31. As soon as normally closed contacts M4 of contactor M are open solenoid S1 is deenergized and valve body 95 of the brake control valve is moved to its uppermost position by the spring 130, wherefore conduit 98 is closed off by the valve body and conduit 97 is open and in communication with conduit 93 to connect the hydraulic actuating brake motor to the sump, whereupon the brake is immediately released and a new work cycle initiated. The operator may either leave the spindle positioning switch PS closed or he can open said switch, in which event he will have to close the same again during the last operative step of the work cycle.

The operator ordinarily in machining a run of work pieces wherein spindle positioning in desirable would leave the spindle positioning switch closed until the complete run of the work pieces has been finished. If it should happen that a spindle positioning was not required or necessary in connection with a particular run of work pieces then the spindle positioning switch could be left open and the start and stop switches would function to energize and deenergize the motor and release and apply the brake.

*Form of Figs. 10 to 16 inclusive*

In the embodiment of the invention illustrated in Figs. 10 to 16 inclusive the spindle connecting hydraulic motor is omitted and the bevel gear 49 is connected by a different connecting arrangement to the shaft 138 that corresponds to the shaft 50 of the first described form.

The spindle positioning hydraulic motor employed in the form shown in Figs. 10 to 16 inclusive is the same in construction and purpose as the corresponding motor in the first described form as are also many of the corresponding parts, and consequently wherever possible these parts will be given the same reference characters as designate the corresponding parts in the previously described form and a detailed description thereof need not be repeated herein.

The bevel gear 49 is freely rotatable on the shaft 138 which corresponds to the shaft 50 and mounts the pinion 51 which meshes with the rack bar 52 on the rod 53 that is connected to the piston 54 of the spindle positioning hydraulic motor. The shaft 138 is shorter than the shaft 50 and has fixed thereto an arm 139 which rotates therewith but is held against endwise movement. The arm 139 is provided with a pin 140 corresponding in purpose to the pin 72 and having on its end adjacent to the gear 49 a beveled or ratchet type head 141, it being understood that the pin 140 and head 141 are urged toward the gear 49 by a spring 142 similar to the spring 75. The gear 49 instead of mounting two pairs of buttons such as the buttons 77 mounts two buttons 143 spaced 180° apart and each provided with a driving shoulder 144 and an inclined or camming surface 145, with said shoulders 144 and surfaces 145 being oppositely disposed on the two buttons for a purpose later to be explained.

Figure 12:
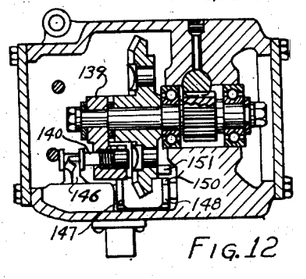
Fig. 12 is a view similar to Fig. 11 but illustrates the parts shown in Fig. 11 in a different operative relationship.
Figure 13:
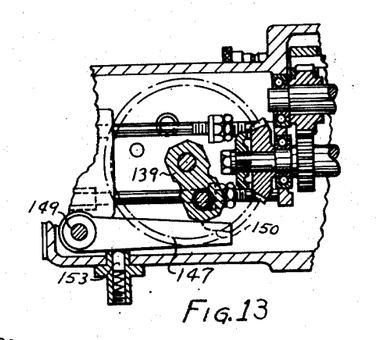
Fig. 13 is a fragmentary view similar to Fig. 10 but illustrates the parts in a different operative relationship.
Figure 14:
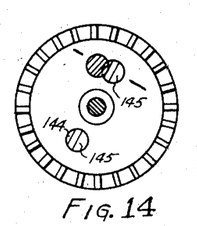
Figs. 14 and 15 are views similar to Figs. 6 and 7 but covering the modified form.
Figure 15:
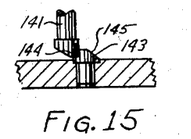

In order to hold the pin 140 retracted so that its ratchet head 141 is in a retracted position with respect to the buttons 143, the housing 35 interiorly thereof is provided with a camming rib 146 that engages between spaced shoulders on the pin 140 as clearly shown in Fig. 12 and holds the pin retracted against the action of its spring 142 when the rotation of the arm 139 causes the spaced shoulders on the pin to straddle the camming rib 146.

It will be understood that rotation of the arm 139 in the opposite direction causes the spaced shoulders on the pin 140 to ride off of the camming rib 146 so that spring 142 will move the pin 140 and its head 141 to projected position with the head 141 located so as to engage one or the other of the buttons 143.

Figure 10:
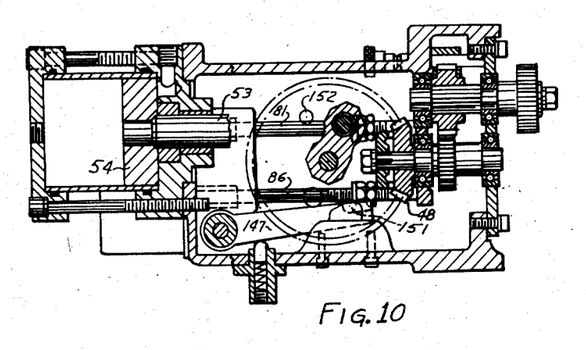
Fig. 10 is a view similar to Fig. 3 but illustrates a different form of the invention.
Figure 11:
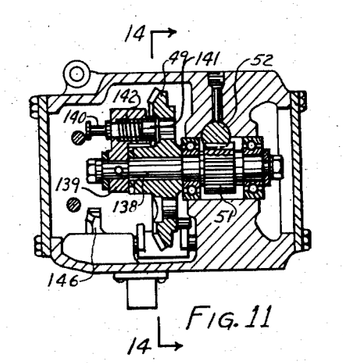
Fig. 11 is a view similar to Fig. 5 but illustrates the said different form of invention.

It will be seen that rotation of the arm 139 in a clockwise direction, as viewed in Fig. 10, will cause the head 141 to engage the shoulder 144 of one of the pins to impart clockwise rotation to the gear 49 to position the spindle 24. When the arm 139 is rotated in the counterclockwise direction the head 141 will ride off of and away from the shoulder 144 to disconnect the driving connection between the arm and the gear 49 and as it continues to rotate counterclockwise the head 141 will ride up the inclined surface 145 of the other button 143 and the pin will be depressed and then as the counterclockwise rotation continues the head 141 rides off of the other button and past said button and until the cam rib 146 engages between the shoulders of the pin and retracts the pin.

It will be understood that the pin 140 at the end of the clockwise rotation of the arm 139 engages the nut 85 on the rod 81 to shift said rod and allow normally closed switch PLS1 to close similarly as in the previously described form. Also it will be understood that at the end of the counterclockwise rotation of the arm 139 the pin 140 engages the nut 87 on rod 86 to shift said rod and allow normally open switch PLS2 to open as previously explained in the first described form.

Inasmuch as the head 141 has only a one-sided driving contact with the shoulder 144 on the button 143 of the bevel gear the momentum of the bevel gear may cause the pin 143 to move away from the head 141 at the end of the spindle positioning movement unless the bevel gear 49 is positively stopped. In order to accomplish the positive stopping of the bevel gear 49 at such time the following mechanism is employed. A lever having spaced arms 147 and 148 is pivotally mounted in the housing, as indicated at 149, in such position that the bevel gear 49 can rotate between the arms 147 and 148. The free end of the arm 148 is provided on its upper edge with a notch 150 adapted to receive one or the other of a pair of lugs 151 and 152 carried on the rear side of the bevel gear 49 and spaced apart 180°.

The two-armed lever is normally held in elevated position wherein one or the other of the lugs 151 and 152 will engage the notch 150 by means of a spring-pressed plunger 153 acting on the arm 147 of the two-armed lever. The arm 139 fixed to the shaft 138 near the completion of its counterclockwise rotation engages the lever arm 147 and depresses the two-armed lever to position the notch 150 out of the path of the lug 151 or 152. Consequently the lug 151 or 152 is freed from the notch 150 at the end of the counterclockwise or return movement of the arm 139 and hence the start of the positioning rotation of the arm 139 and gear 49 is not interfered with.

Figure 16:
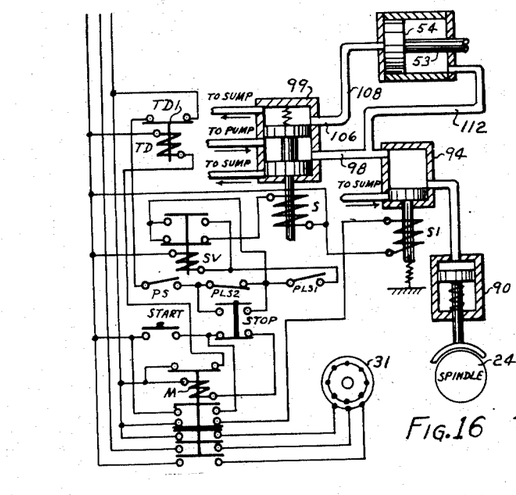
Fig. 16 is a diagrammatic view similar to Fig. 9 but illustrates the form of the invention shown in Figs. 10 to 15 inclusive.

Referring to Fig. 16 showing diagrammatically the electrical circuit and hydraulic circuit for the modified form of Figs. 10 to 16 inclusive, it will be seen that the electrical circuit is identical with the first described electrical circuit and that the hydraulic circuit differs therefrom merely in the omission of the spindle connecting hydraulic motor, the conduits leading thereto and between said motor and the spindle positioning hydraulic motor and the two check valves in the previously described hydraulic circuit. Consequently the electrical circuit and the hydraulic circuit have the same reference characters applied thereto as in the previously described circuits, it being noted that conduits 106 and 108 in the modified form are shown as a single conduit while conduit 112 is shown as a single conduit connected directly to the conduit 98.

The operation of the modified form will now be described, it being understood that the gear 41 is meshed with the gear 42 and that the spindle positioning switch PS is closed. At this time the arm 139 and bevel gear 49 and their associated parts will be in the position shown in Fig. 13 with the rod 86 shifted to the right against its spring so that normally open switch PLS2 is free to open while the rod 81 is holding normally closed switch PLS1 open. At the end of the operative work cycle the operator closes the stop switch whereupon the main electric motor 31 is deenergized and solenoid S1 is energized and the brake 88 is immediately applied to the spindle as in the first described form through the brake control valve. The operator continues to hold the stop switch closed and then the time delay switch is closed after an interval, whereupon the solenoid S is energized to shift the valve body of the master control valve to move the lands thereof to a position wherein the brake is connected to sump and is released. At this time conduit 106, 108 is connected to the pump or pressure side of the hydraulic circuit and hydraulic pressure fluid flows to the spindle positioning hydraulic motor to move the piston thereof toward the right, it being noted that conduit 112 now is connected through conduit 98 to the sump side of the hydraulic circuit. The moment such movement of the piston 54 occurs the rack 52 moves and the shaft 138 is rotated in a clockwise direction moving the arm 139 in the same direction. The first result of this movement of the arm 139 is to release the rod 86 which under the action of its spring closes the normally open switch PLS2 to establish a holding circuit around the stop switch. The start of the clockwise rotation of the arm 139 causes the spaced collars on the pin 140 to ride off of the cam rib 146, thus releasing the pin and positioning the head 141 in the path of the shoulder 144 of one of the pins 143. As soon as the head 141 engages said shoulder a driving connection is established between the arm 139 and the bevel gear 49.

It will also be recalled that the start of the clockwise rotation of the arm 139 permits the two-arm lever to rock upwardly under the action of the spring plunger 153 and into a position where the notch 150 is in the path of movement of one or the other of the pins 151 and 152. The arm 139 and the bevel gear 49 rotate together in a clockwise direction thus imparting positioning rotation to the spindle 24 through the unbroken gear train. As soon as the piston 54 of the spindle positioning hydraulic motor reaches the end of its positioning movement it is positively stopped and concurrently one of the lugs 151 and 152 engages in the notch 150 of the lever arm 148 and further clockwise rotation of the gear 49 is positively arrested. Also at this time the pin 140 has engaged the nut 85 on the rod 81 and shifted said rod against the action of its spring to free the normally closed switch PLS1 for closing movement. The closing of switch PLS1 acts through contactor SV to deenergize solenoid S, whereupon the body of the master control valve is shifted, the brake is applied to the spindle and the piston 54 of the spindle positioning hydraulic motor moves from the right hand end of its cylinder to the left hand end thereof to restore the parts to the position shown in Fig. 13 with the last part of such restoring movement causing the cam rib 146 to retract the pin 140, while the arm 139 depresses the two-armed lever against its spring plunger to free the lug of the gear 49 from the notch 150 in the arm 148 of the two armed lever. At the start of the restoring movement the pin 140 leaves nut 85 and rod 81 opens normally closed switch PLS1. At the end of the counterclockwise movement pin 140 engages nut 87 to shift rod 86 and allow normally open switch PLS2 to open.

Although several embodiments of the invention have been illustrated and described herein it will be understood that the invention is not to be limited thereto except in so far as it is limited by the scope of the appended claims.

Having thus described my invention, I claim:

1. A spindle positioning mechanism for a machine tool of the type having a rotatable spindle and a power drive source for rotating the same and comprising a reciprocating fluid pressure spindle positioning motor, a drive train between said spindle and motor and including a connecting and disconnecting means, a fluid pressure circuit to said motor for actuating the same between its limits of movement in opposite directions, control means for said circuit to effect when said power drive source is inactive operation of said motor in one direction between its limits of movement, and means acting automatically when said motor is thus operating to effect connection of said connecting and disconnecting means to impart a positioning rotation to said spindle and to bring the same to a predetermined position.

2. A spindle positioning mechanism as defined in claim 1 and wherein said control means includes elements operable automatically when said motor reaches its limit of movement in said one direction to disconnect said connecting and disconnecting means and initiate reverse operation of said motor to its limit of movement in the opposite direction.

3. A spindle positioning mechanism as defined in claim 1 and wherein there is a fluid pressure actuated brake operating on said spindle, with said brake connected in said fluid pressure circuit, while said control means includes elements operating automatically upon the start of the operation of said motor in said one direction to release said brake and upon the completion of such operation of said motor to apply said brake and maintain the same applied.

4. A spindle positioning mechanism for a machine tool of the type having a rotatable spindle and a power drive source for rotating the same and comprising a reciprocating fluid pressure spindle positioning motor, a drive train between said spindle and motor and including a connecting and disconnecting means, a fluid pressure circuit to said motor for actuating the motor between its limits of movement in opposite directions and including a control valve and an electrical circuit including an electromotive device for actuating said valve to effect when said power drive source is inactive operation of said motor in one direction between its limits of movement, and means acting automatically when said motor is thus operating to effect connection of said connecting and disconnecting means to impart a positioning rotation to said spindle to bring the same to a predetermined position.

5. A spindle positioning mechanism as defined in claim 4 and wherein said electrical circuit includes switches operable automatically when said motor reaches its limit of movement in said one direction to actuate said electromotive device to move said valve to initiate reverse operation of said motor to its limit of movement in the opposite direction and to disconnect said connecting and disconnecting means.

6. A spindle positioning mechanism as defined in claim 4 and wherein there is a fluid pressure actuated brake operating on said spindle, with said brake connected in said fluid pressure circuit, while said electrical circuit includes elements operating automatically upon the start of the operation of said motor in said one direction to release said brake and upon the completion of such operation of said motor to apply said brake and maintain the same applied.

7. A spindle positioning mechanism for a machine tool of the type having a rotatable spindle and a power drive source for rotating the same and comprising a reciprocating fluid pressure spindle positioning motor, a drive train between said spindle and motor and including a connecting and disconnecting means, a fluid pressure circuit to said motor for actuating the same between its limits of movement in opposite directions and including a master control valve, a brake mechanism operating on said spindle, a fluid pressure brake actuating motor for actuating said mechanism and connected in said fluid pressure circuit, a brake control valve in said circuit, an electrical control circuit for said valves including electromotive devices for actuating the valves and control elements acting when said power drive source becomes inactive to energize the electromotive device which actuates the brake control valve to operate the brake actuating motor to apply the brake mechanism, and control elements acting to energize the electromotive device which actuates the master control valve to shift said valve to effect release of said brake mechanism and operation of said spindle positioning motor in one direction between its limits of movement, and means acting automatically when said spindle positioning motor is thus operating to effect connection of said connecting and disconnecting means to impart a positioning rotation to said spindle to bring the same to a predetermined position.

8. A spindle positioning mechanism for a machine tool of the type having a rotatable spindle and a power drive source for rotating the same and comprising a reciprocating fluid pressure spindle positioning motor, a drive train between said spindle and motor and including a member operatively connected to said motor and a member operatively connected to said spindle with one of said members provided with a movable connecting element while the other of said members is provided with an element cooperating with said movable element to operatively interconnect said members, a fluid pressure circuit to said motor for actuating the same between its limits of movement in opposite directions, control means for said circuit to effect when said power drive source is inactive operation of said motor in one direction between its limits of movement, and means acting automatically when said motor is thus operating to effect cooperation between said movable element of the one member and said element of the other member to operatively connect said motor and spindle to impart a positioning rotation to said spindle to bring the same to a predetermined position.

9. A spindle positioning mechanism as defined in claim 8 and wherein said control means includes control elements operable automatically when said motor reaches its limit of movement in said one direction to initiate reverse operation of said motor to its limit of movement in the opposite direction and to interrupt the operative connection between said motor and spindle by disengaging the movable element of the one member from the cooperating element of the other member.

10. A spindle positioning mechanism for a machine tool of the type having a rotatable spindle and a power drive source for rotating the same and comprising a reciprocating fluid pressure spindle positioning motor, a drive train between said spindle and motor and including a member connected to said motor and a member connected to said spindle, one of said members being provided with a movable element and the other of said members being provided with an element cooperating with said movable element to interconnect said members and establish said drive train, a fluid pressure circuit to said motor for actuating the same between its limits of movement in opposite directions, control means for said circuit to effect when said power drive source is inactive operation of said motor in one direction between its limits of movement, means acting automatically when said motor is thus operating to effect cooperation of said elements carried by said members to operatively interconnect said motor and spindle to impart a positioning rotation to said spindle to bring the same to a predetermined position, said control means including control elements and actuating members for said elements located so as to be controlled by the movable element of the one member of the drive train at the limits of movement of the spindle positioning motor in opposite directions.

11. A spindle positioning mechanism as defined in claim 10 and wherein said control means includes a valve in said fluid pressure circuit, an electromotive device for actuating said valve and an electrical circuit including said device, said control elements being switches arranged in said electrical circuit and controlling said electromotive device while said actuating members for said switches are shiftable rods normally engaging and depressing the actuating buttons of said switches but located so as to be controlled by the movable element of the one member of the drive train at the limits of movement of the spindle positioning motor in opposite directions.

12. A spindle positioning mechanism for a machine tool of the type having a rotatable spindle and a power drive source for rotating the same and comprising a spindle positioning motor, a drive train between said spindle and motor and including a connecting and disconnecting means, means operatively associated with said motor and drive train on the motor side of said connecting and disconnecting means for limiting positively the movement thereof between predetermined limits in opposite directions, a power circuit to said motor for actuating the same between said limits in opposite directions, control means for said circuit to effect when said power drive source is inactive operation of said motor in one direction between said limits of movement, and means acting automatically when said motor is thus operating to effect connection of said connecting and disconnecting means to impart a positioning rotation to said spindle to bring the same to a predetermined position.

13. A spindle positioning mechanism for a machine tool of the type having a rotatable spindle and a power drive source for rotating the same and comprising a spindle positioning motor, a rotatable shaft, a drive train between said shaft and motor, means operatively associated with said motor and drive train for limiting positively the movement thereof between predetermined limits in opposite directions, a member on and rotatable with said shaft, a gear member freely rotatable on said shaft, an operative connection between said gear member and said spindle, one of said members being provided with a movable connecting element and the other of said members with an element cooperating with the movable element to interconnect said members, a power circuit to said motor for actuating the same between said limits in opposite directions, control means for said circuit to effect when said power drive source is inactive operation of said motor in one direction between said limits of movement, said movable element of the one member automatically cooperatively engaging the element of the other member when said motor is thus operating to effect a driving connection between said motor and spindle to impart a positioning rotation to said spindle to bring the same to a predetermined position.

14. A spindle positioning mechanism for a machine tool as defined in claim 13 and wherein the member on and rotatable with said shaft is an arm fixed on said shaft and held against axial movement relative thereto while said movable connecting element is carried by the outer end of said arm and includes a spring-pressed pin having a ratchet head while the element which cooperates with the movable element is carried by said gear member and is a ratchet-headed button.

15. A spindle positioning mechanism as defined in claim 14 and wherein said pin is provided with spaced shoulders while a stationary cam rib is predeterminedly located to engage between said shoulders during a portion of the rotative movement of said shaft and arm to cam the pin away from said gear member to position the ratchet head of the pin away from the ratchet-headed button on said gear member, wherefore when said shaft and arm start to rotate in a spindle positioning direction said shoulders ride off said cam rib and said pin is released so the ratchet head thereof is located to engage the ratchet-headed button of the gear member to interconnect said members while near the end of the movement of the motor and drive train in the opposite direction said shoulders straddle said cam rib and said pin is retracted.

16. A spindle positioning mechanism as defined in claim 14 and wherein said gear member has a stop lug on the side thereof opposite to the side provided with said button while a spring-pressed pivoted stop lever has a portion provided with a recess normally in the path of said stop lug and engageable therewith to stop rotation of said gear member when said cooperating elements are disconnected after the spindle is positioned, said arm member acting at the end of its movement in the opposite direction to move said lever to position the recess portion thereof out of the path of said stop lug.

17. A spindle positioning mechanism for a machine tool of the type having a rotatable spindle and a power drive source for rotating the same and comprising a spindle positioning motor, a rotatable shaft, a drive train between said shaft and motor, means operatively associated with said motor and drive train for limiting positively the movement thereof between predetermined limits in opposite directions, a sleeve member on and rotatable with said shaft and movable axially thereof, a gear member freely rotatatable on said shaft, an operative connection between said gear member and said spindle, said sleeve member being provided with a movable connecting element and said gear member with an element cooperating with the movable element to interconnect said members, a spindle connecting motor operatively connected to said sleeve member for moving the same axially of said shaft in opposite directions to position said movable element out of active relationship with respect to the cooperating element on the gear member or in a position wherein said elements can cooperate, a power circuit to said spindle positioning motor for actuating the same between said limits in opposite directions, said power circuit also including said spindle connecting motor for operating the same in opposite directions, control means for said circuit to effect when said power drive source is inactive operation of said spindle connecting motor to move said sleeve and position said elements in cooperative relationship to effect a driving connection between the spindle positioning motor and the spindle, said control means for said circuit effecting operation or said spindle positioning motor in one direction between said limits of movement to impart a positioning rotation to said spindle to bring the same to a predetermined position.

18. A spindle positioning mechanism as defined in claim 17 and wherein said spindle connecting motor and said spindle positioning motor are fluid pressure motors arranged in a fluid pressure power circuit in series and said circuit includes a control valve for initiating operation of said spindle connecting motor in opposite directions while said spindle connecting motor acts as a valve to control the flow of pressure fluid to said spindle positioning motor wherefore said motors move in sequence in opposite directions.

19. In a machine tool, a rotatable spindle, an electric motor for rotating said spindle at working speeds, a brake mechanism for said spindle, power means for actuating said mechanism, control means for said motor and power means normally acting automatically upon deenergization of said motor to cause said power means to apply said brake mechanism and upon energization of said motor to release said brake mechanism, a spindle positioning motor, and a drive train between said spindle positioning motor and said spindle and including a connecting and disconnecting means, said control means including a settable control member and control elements acting upon deenergization of said electric motor when said member is set in a predetermined position to cause said power means to apply said brake momentarily and then release the same and then acting to cause actuation of said spindle positioning motor and said connecting and disconnecting means to connect said spindle positioning motor and said spindle to impart a positioning rotation to the latter; said control means further including elements automatically operable after a predetermined positioning rotation of the spindle to cause operation of said power means to apply said brake mechanism, operation of said connecting and disconnecting means to disconnect said spindle positioning motor and said spindle, and reverse operation of said spindle positioning motor.

20. In a machine tool, a rotatable spindle, an electric motor for rotating said spindle at working speeds, a brake mechanism operating on said spindle, a fluid pressure brake actuating motor, a fluid pressure spindle positioning motor, a drive train between said spindle positioning motor and said spindle and including a connecting and disconnecting means, and control means for said electric motor and said fluid pressure motors and including an electrical control circuit and a fluid pressure control circuit, said electrical control circuit including a switch for energizing and deenergizing said electrical motor, said fluid pressure control circuit including a valve controlling said brake actuating motor and said electrical control circuit including a solenoid automatically energized when said electrical motor is deenergized to actuate said brake control valve to cause said brake motor to apply said brake, said fluid pressure circuit including a master control valve controlling both of said fluid pressure fluid motors while said electrical circuit includes a solenoid for actuating said master control valve and a settable member which when set in a predetermined position causes upon deenergization of said electrical motor energization of the solenoid for actuating the master control valve to effect release of the brake mechanism and actuation of the spindle positioning motor and of said connecting and disconnecting means to connect said spindle positioning motor and said spindle to impart to the latter a positioning rotation upon the termination of which said solenoid for actuating the master control valve is automatically deenergized, said brake mechanism is applied, said connecting and disconnecting means is disconnected and a reverse actuation of said spindle positioning motor is effected.

ROSS B. TREER.

References Cited in the file of this patent

UNITED STATES PATENTS

| Number | Name | Date |
| --- | --- | --- |
| 2,191,137 | Trible | Feb. 20, 1940 |
| 2,360,576 | Overstedt | Oct. 17, 1944 |